Feb. 16, 1943.                T. ULRICH                 2,311,603
              SPRING SUSPENSION ESPECIALLY FOR VEHICLES
                        Filed Aug. 3, 1940
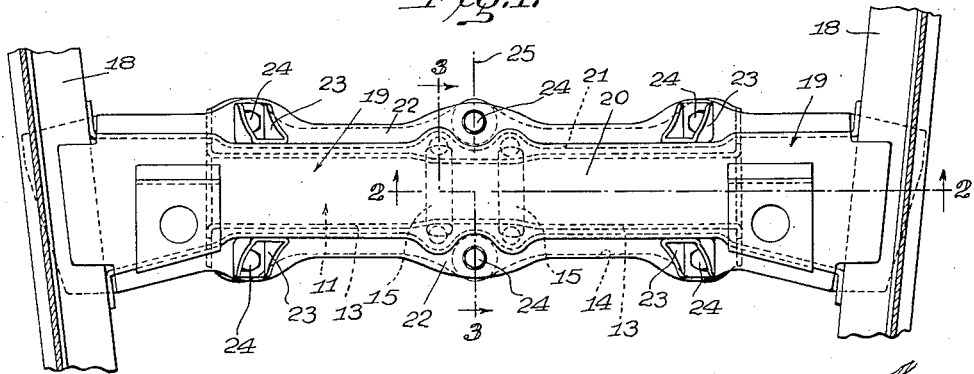
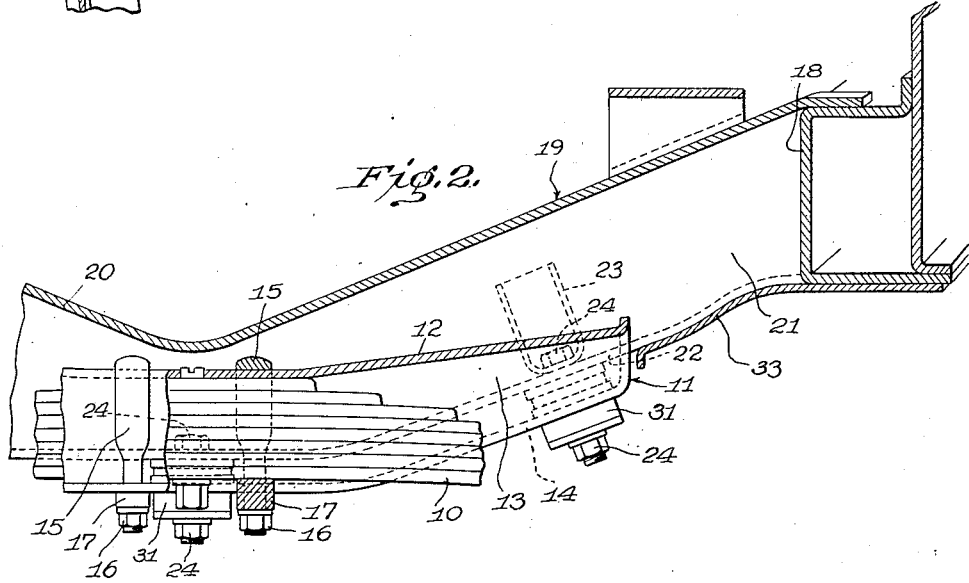
INVENTOR
Theodore Ulrich
BY John P Tarbox
ATTORNEY Patented Feb. 16, 1943

2,311,603

UNITED STATES PATENT OFFICE 2,311,603

SPRING SUSPENSION, ESPECIALLY FOR VEHICLES

Theodore Ulrich, Detroit, Mich., assignor to Edward G. Budd Manufacturing Company, Philadelphia, Pa., a corporation of Pennsylvania Application August 3, 1940, Serial No. 350,748

3 Claims. (Cl. 280—106.5)

The invention refers to a spring suspension especially for vehicles and still more particularly to the attachment of a transverse spring to a chassis or to a combined body and chassis structure.

It is among the objects of the invention to create a spring suspension in which a member is rigidly connected to the leaf spring, which member reinforces a member of a chassis or underframe, and in which provision is made to prevent vibrations to pass from the spring to said chassis or frame.

The objects of the invention are outstandingly attained by clamping an elongated, preferably channel-shaped member rigidly to the spring in the zone where the different leaves are held together, by providing the chassis or underframe with a channel-shaped supporting member into which said first member fits with play, and by arranging fastening means comprising vibration dampening parts between said two members in a central region and in regions spaced in the longitudinal direction of the spring from said central region.

Further objects, features and advantages of the invention will appear from the following description of an embodiment of the invention when read in conjunction with the attached drawing.

In the drawing:

Figure 1 is a fragmentary plan view of the front end of a vehicle underframe structure provided with an embodiment of the new suspension.

Figure 2 is a front elevation, partly in section, along line 2—2 of Figure 1.

Figure 3 is a section along line 3—3 of Figure 1.

10 is a leaf spring the ends of which may be attached by any conventional means to an axle of an automobile. The central portion of the spring is nested in an inverted channel-shaped member 11 which has a bottom wall 12, side walls 13 and flanges 14 extending from the lower edges of the side walls. 15 are clips, 16 nuts and 17 plates which serve for clamping the leaves of the spring 10 in the channel member.

The underframe comprises longitudinal side sill members 18 and a transverse beam 19, the latter being rigidly fastened to the former. The beam 19 is also in the form of an inverted channel and has a top wall 20, side walls 21 and flanges 22. Angle brackets 23 have one of their arms rigidly fastened to the side walls 21 and the other arm to the flanges 22. Two pairs of such brackets are provided, one pair on either side between the longitudinal middle plane and the side sills 18 of the frame. The spring 10 with its member 11 is slid from the underside into the transverse beam 19 and the two members are clamped together by three pairs of bolts and nuts 24. Two pairs of bolts pass through holes in said angle brackets 23 and flanges 22 and through corresponding holes in the flanges 14 of the member 11. The third pair of bolts passes through holes in the flanges 14 and 22 and are arranged on the longitudinal center line 25 of the vehicle. The flanges 14, 22 are widened in regions of the bolts 24 and the side walls 21 of beams 19 are outwardly bulged at the location of the clips 15.

The brackets 23, the flanges 14, 22 and the bolts with their heads and nuts, do not directly engage each other by an uninterrupted chain of metal-to-metal contacts but the chain is interrupted by vibration dampening material.

The flanges 14, 22 of the upper and lower members have their holes considerably wider than the diameter of the connecting bolts 24. Flat cup-shaped stampings 26 or the like engage the walls of those openings with a flange 27, whereas between each two of these cup-shaped members a piece 28 of "Fabreeka," rubber or the like is inserted. The outer edge of these inserts engages the outer flanges 29 of the cup-shaped members 26 thereby insuring the desired location between the two members 11 and 19. The bolts 24 rest against the flanges 22 or brackets 23 by means of metallic washers 30 whereas a resilient plate 31 with a metallic cover 31' and a washer 32 is inserted between the nut of the bolts 24 and the flanges 14 of the member 11.

The beam 19 is angle-shaped in front elevation with the apex of the angle on the center line 25 and the arms extending upwardly toward the side sills 18. The member 11 does not extend to the sills and the mouth of the beam 19 between the sills 18 and the ends of the member 11 is closed by plates 33 for strengthening purposes.

By supporting the spring and its member in a middle region and in two laterally spaced regions by pairs of longitudinally spaced connecting means, the transverse beam 19 is relieved from heavy stresses and, indeed, the spring member 11 and the beam 19 mutually interbrace and strengthen each other. In view of the absence of an uninterrupted chain of metal-to-metal connections between the spring 10 with its member 11 and the beam 19, vibrations and noises originating on the road, in the wheels or in the wheel suspension are kept from the chassis and the body.

The invention is based to a certain extent on similar principles as disclosed in applicant's copending applications Serial No. 299,594 of October 16, 1939, "Spring suspension for chassis," and Serial No. 301,917 of October 30, 1939, "Vehicle spring suspension system," but the arrangement in accordance with the present invention is considered to be, especially for certain conditions, better and therefore preferable.

The invention is not limited to the specific details of the shown and described embodiments but many modifications will occur to those skilled in the art without departing from the spirit of the invention. All such modifications are intended to be covered by the appended claims.

What is claimed is:

1. In a spring suspension especially for vehicles, a leaf spring, a member attached to said spring, connecting points on said member at least one in the central region and at least one each in regions spaced from said central region, a frame member of inverted channel-shape having connecting points registering with the connection points on and being of greater length than said first member, said frame member being adapted to receive substantially said first member and the adjacent spring portion in its interior; the portions of said frame member adjacent to and extending beyond said first member having the mouth of the channel closed by reinforcing plates; connecting means including resilient inserts being provided at all said connecting points, so that the spring is securely held, that the two members mutually interbrace each other and that vibrations are prevented to pass from the spring to said frame members.

2. In a spring suspension especially for vehicles, a leaf spring, a member rigidly attached to said spring, a hollow section beam forming part of a structure to be suspended, said beam being longer than said member and having an open side over part of its length, whereas the adjacent portions are of closed box sectional form, said beam being adapted to receive through the open side in its interior said member and the part of the spring held thereby, connecting means between said member and said beam, such connecting means including resilient inserts so that the spring is securely held in place with respect to said frame member and that vibrations passing from the spring to said beam are dampened.

3. In a spring suspension especially for vehicles, a leaf spring, an inverted channel member rigidly attached to said spring, a beam of inverted channel-shape forming part of a structure to be suspended, said member and said beam having laterally extending flanges along the lower margins of their side walls, the width and depth of the beam being such as to allow the housing of the member in its interior with play, connecting means between the flanges of said beam and said member, said member being shorter than said beam, the portion of said beam extending beyond said member having the mouth of the channel closed by reinforcing plates.

THEODORE ULRICH.